2,874,134
PRODUCTION OF GLUE FROM SOLUBLE BLOOD

John M. Gossett, Portland, Oreg., and Max H. Estep, Jr., and Mahlon J. Perrine, Seattle, Wash., assignors to American-Marietta Company, Chicago, Ill., a corporation of Illinois No Drawing. Application June 1, 1955
Serial No. 512,568

17 Claims. (Cl. 260—6)

The present invention relates to the production of an adhesive composition or glue utilizing soluble blood as a constituent thereof, and is particularly useful in the manufacture of plywood.

In one form of the present invention there is provided an adhesive composition or glue containing an adhesive material such as blood and optionally a resin constituent, said adhesive composition or glue while having pronounced color properties, being characterized by a low penetration value when applied to wood veneers and, therefore, is of special value in the uniting or gluing of thin furniture veneers since staining of the latter is greatly reduced or substantially eliminated. The herein adhesive composition having said property of "low penetration into the wood" and which reduces or substantially inhibits "bleed-through" of the glue when applied to thin hardwood furniture veneers, is characterized by a pH which is relatively low as compared to conventional plywood adhesive compositions.

In accordance with the present invention, soluble blood as, for example, soluble dried blood or a mixture of soluble dried blood and fresh blood is coagulated while maintaining the coagulated blood particles in a finely divided condition and dispersed throughout the aqueous medium. The blood dispersion is then treated with an alkaline medium to increase the adhesive properties of the coagulated blood dispersion and to provide a pH that will produce a practical glue viscosity in the final glue adhesive composition. The pH of the coagulated aqueous dispersion of blood before the addition of the alkaline medium may be below 7 or around 7 or 7.5. The pH of the dispersion is raised to between about 9 and 9.7 and preferably between 9.2 and 9.5 to confer on the final glue a viscosity which will assist in preventing penetration of the adhesive composition or glue into the wood veneers. It has been ascertained that the aqueous dispersion of the blood should have a minimum pH of about 9 to provide a glue of practical viscosity. The higher the pH is raised above 9, the higher will be the final viscosity.

While the blood coagulum may be used as an adhesive composition with a pH as above set forth, in accordance with the present invention the blood coagulum is treated with an acidic material or a low alkaline material to reduce the pH thereof to below 9. The acidic material may take the form of an acid or an acid salt. The low alkaline material used to reduce the pH is preferably a low alkaline thermosetting resin. When the low alkaline thermosetting resin does not function to reduce the pH of the blood coagulum to below about 9, it may have combined therewith an acid or an acid salt in an amount sufficient to reduce the pH of the blood coagulum to below about 9, or after the glue containing the blood coagulum and the thermosetting resin has been formulated, then an acid or an acid salt may be incorporated in the glue in an amount sufficient to reduce the pH to below about 9. The pH of the blood coagulum or glue may be reduced to the range of a pH of about 3 to just below 9, the preferred range being between about 4 and about 8.5. There is thus obtained an adhesive composition or glue which has an improved flow on the veneers and which prevents discoloration of the wood veneers. While the reduction in pH of the aqueous adhesive composition or glue does somewhat decrease the viscosity of the final glue, the viscosity thereof is not reduced as much as would normally occur since the aqueous blood dispersion has been previously treated, as pointed out, with an alkaline material to raise the pH of the aqueous blood dispersion and the viscosity thereof.

It is desired to point out that an adhesive composition or glue containing coagulated blood particles and having a pH of about 9 to about 9.5 has a tendency to gel. While the gelation can be controlled by the addition of water, this is not the most desirable form of control. It is preferred that the running properties of the final adhesive composition or glue be controlled by the addition of small amounts of pH regulating agents which may be in the form of acid or acid compounds or in the form of thermosetting resins and desirably low alkaline thermosetting resins having a pH within the range of about 7.1 to 7.8 which will reduce the pH of the adhesive mixture below about 9, as will be herein more completely pointed out.

The adhesive composition of the present invention utilizes as an adhesive constituent soluble blood as distinguished from insoluble dried blood commonly known in the art as fertilizer blood. The dried soluble blood is prepared by drying fresh blood without coagulating it. The so-called soluble blood of commerce is substantially wholly soluble, but varies from source to source. For reference herein, this commercially available material is referred to as soluble dried blood. The so-called fertilizer blood or insoluble coagulated dried blood is prepared by heating or otherwise treating fresh blood to coagulate it, after which it is dried to an insoluble state and ground. This product is not soluble in water and is ordinarily used for feed or fertilizer.

In carrying out the present invention, there is first formed a uniform, stable, aqueous dispersion of finely divided, undried, coagulated blood particles. This produces a glue constituent which is further treated as hereinafter pointed out. Although this blood material may be made by grinding coarse lumps of freshly coagulated undried blood as by passing them through a colloid mill in aqueous suspension, a superior product is obtained by dissolving in water the dried soluble blood of commerce (and/or liquid, undried blood if desired), and then coagulating it while subjecting it to vigorous agitation or other conditions calculated to form a fine dispersion of coagulated blood particles in the aqueous medium.

The coagulation of the soluble blood may be effected in any desired manner by the application of heat or by a combination of heat and chemicals. When heat is used, the aqueous blood material may be heated to a temperature between about 120° F. and the boiling point of the aqueous blood material. In coagulating the blood, water soluble dried blood for example, first is mixed with sufficient water to form a thin slurry. The slurry may comprise about 1 to 3.5 parts by weight of water to 1 part by weight of soluble dried blood. If the starting material is fresh blood, the water content thereof must be taken into consideration in the glue mix. The above is set forth by way of example and not by way of limitation, as the invention is not limited by the proportion of water to dried soluble blood. Functionally enough water should be mixed with the soluble dried blood or its equivalent to adequately wet and disperse the blood thoroughly. A small amount of an anti-foaming agent may be added to control foaming. Any of the prior art anti-foaming agents may be used, an example thereof being pine oil. The final glue may have an amount of water varying from 6 to 10 parts by weight of water to 1 part by weight of blood solids calculated as soluble dried blood. Again, the above is set forth as illustrative of a suitable ratio and not by limitation, it being understood that the invention is not limited thereto.

The mixing of the soluble dried blood, which may be spray dried blood, and the water is carried out at approximately room temperature, and the mixing is continued until the slurry is free of lumps and of uniform consistency. The blood dispersion is agitated as herein pointed out. While room temperature or a temperature of about 70° F. is preferred, any temperature between about 40° F. and 100° F. may be used. The main point is that the temperature of the water should not be high enough to coagulate the blood particles present in the blood dispersion.

Thereafter, the resulting blood solution or dispersion, or its equivalent in liquid, undried blood, is heated to a blood coagulating temperature within the broad range of between about 120° F. and the boiling point of the mixture, and preferably between about 120° F. and about 150° F. and the boiling point of the mixture, for a period of time which in general may vary between 1 and 20 minutes, and more narrowly between 1 and 10 minutes. In general, the higher the temperature employed to effect coagulation, the shorter the time required, and the lower the temperature employed, the longer the time required. The coagulation may be effected by adding boiling water to the blood dispersion over a period of 1 to 2 minutes, while the blood material or blood mixture is being agitated to maintain the coagulated blood particles in finely divided condition and dispersed throughout the aqueous medium. This coagulation of the blood is in effect controlled denaturation of the blood by means of heat. The temperature used in coagulation has a direct effect upon the viscosity characteristics of the glue. In general where heat is employed to coagulate, the coagulating temperature is at least 120° F. and may be between 120° F. and the boiling point of the mixture, or somewhat below the boiling point of the mixture. This insures that desirable viscosity characteristics are imparted to the final glue.

The coagulating operation, as previously set forth, is desirably effected with contemporaneous beating, stirring, or other form of agitation. This results in a dispersion of the finely divided particles of coagulated blood throughout the aqueous medium and avoids the formation of undesirable lumps and curds.

The coagulation of the blood present in the blood dispersion may be carried out by injecting steam directly into the blood solution or dispersion, this having the secondary effect of diluting the blood dispersion or solution with the condensed steam. However, it is preferred to use hot water at or about 212° F. to accomplish the necessary heating of the aqueous solution of soluble dried blood or to dilute whole blood or to heat an aqueous solution of soluble dried blood and fresh blood. The hot water serves the dual function of elevating the temperature of the blood solution or dispersion and diluting it to a point where it can be utilized as a commercial glue product. Instead of using heat to coagulate the aqueous solution of blood which prior to being brought into solution has been spray dried but not coagulated, the blood solution may be coagulated by the addition of a chemical agent. This may be desirable in some cases because it eliminates the heating and cooling operations. Suitable acid coagulating agents include mineral and organic acids and salts having an acid reaction in aqueous solution. The mineral and organic acids are preferred. Illustrative of mineral acid coagulating agents are sulfuric acid, hydrochloric acid, phosphoric acid, and the like. Suitable organic acids comprise formic acid, acetic acid, propionic acid, and the like. Representative acid salts include sodium acid sulfate or sodium bisulphate, aluminum sulfates, potassium acid sulfate, and the like. Any of these materials and their equivalents may be dissolved in water and the resulting acid solution added to an aqueous solution of the soluble blood or directly to the fresh blood in an amount sufficient to coagulate the same. Again the total amount of water used which may be mixed with the solution of soluble blood or to the soluble dried blood, may vary from about 3 parts to about 10 parts by weight of water to 1 part by weight of blood calculated as soluble dried blood.

Acid coagulation of an aqueous blood material which may be an aqueous solution of fresh blood, an aqueous solution of soluble dried blood or admixtures thereof, takes place at a pH of about 6 or below. Therefore, in general the quantity of acid coagulating agent added should be such to provide in the aqueous blood dispersion a pH below about 6, as, for example, a pH of about 2.5 to about 5 or about 3 to about 5. Appropriate pH measurements are obtained by the glass electrode method.

The coagulating operation when using an acid blood coagulating agent is desirably accomplished by thorough stirring or other form of agitation to avoid the formation of lumps, and may or may not be accompanied by the contemporaneous application of heat to increase the coagulation rate.

The resulting coagulum is in general similar to that produced by the action of heat alone and has adhesive properties. This coagulum is treated as hereinafter particularly pointed out.

It has been discovered that the coagulation or denaturation of the blood present in the aqueous blood solution of the character herein set forth may be accomplished by a combination of heat and pH adjustment. More specifically, it is possible to denature or coagulate the blood in an aqueous solution having a pH range from about 6 to about 10 when utilizing a temperature between the limits of about 120° F. and the boiling point of the mixture. It is also possible to coagulate the blood at a lower temperature with the blood at a pH of below about 6. In general, the higher the temperature, the more rapid the coagulation. The herein described aqueous solution of soluble dried blood and its equivalents desirably may have a pH between 6 and 8 and the temperature of coagulation may desirably be between the limits of 120° F. and 150° F. Below about 120° F. little or no denaturation or coagulation of the blood occurs between a pH of 6 and 9.5. Above pH 10 there is a tendency for gelation and hydrolysis to occur which are disadvantageous to the preparation of an adhesive of this type.

It has been discovered that the pH of the aqueous solution of the soluble dried blood and its equivalents controls ease of denaturation or coagulation by heat. When the pH of the aqueous solution is raised above 7 or lowered below 6, it becomes progressively easier to obtain coagulation of the blood solution, that is, coagulation is effected at a lower temperature.

When the aqueous solution of fresh blood, or soluble dried blood, or mixtures thereof has been heat coagulated as herein set forth, the coagulated blood dispersion is cooled to a temperature below about 120° F. When heat coagulation is used, the resulting aqueous dispersion of coagulated blood will have a temperature anywhere from 120° F. to 212° F. or perhaps a few degrees higher at atmospheric pressure. When the aqueous dispersion containing the coagulated blood or coagulum has a temperature between 120° F. to 150° F., cold water having any suitable temperature as, for example, a temperature of 60° F., may be added to reduce the temperature to below 120° F., and preferably to about 90° F. If there is any foaming, a small amount of an anti-foaming agent as exemplified by pine oil, may be added to control the foaming. The cold water is added while the mixture is being agitated and sufficient water is added to reduce the temperature to about 90° F. In one run 125 pounds of water having a temperature of 60° F. was added to about 60 pounds of blood expressed as dried blood. The amount of water added at this point is not critical and more water may be added, or less water may be added, the principal objective being to reduce the temperature of the aqueous solution of coagulated blood to below 120° F. There may be introduced into the glue at any suitable time fillers, such as cereal flours, including wheat flour or other vegetable materials consisting of tree bark, nut shells, and the endocarps of drupes. After the aqueous dispersion of the coagulated blood has been cooled, there is introduced into the blood dispersion an alkaline material to raise the pH of the dispersion substantially above neutrality and simultaneously effect swelling of the blood particles. It has been discovered that enough of a pH regulating agent should be added to cause swelling of the blood particles so that the final glue when treated as set forth, will have a viscosity which will assist in reducing the penetration properties of the glue and substantially inhibit staining of thin veneers when the glue is applied thereto. A minimum pH of about 9 is desirable in order to provide sufficient swelling of the blood particles and desirably the pH should be raised to between the limits of about 9 and about 9.7. Preferably the alkaline material used to raise the pH may be an alkali silicate such as water glass, alkali hydroxide, alkali carbonate, or a combination of alkali hydroxide and alkali carbonate as, for example, sodium hydroxide and sodium carbonate. While the potassium and lithium hydroxides or potassium and lithium carbonates may be used, preferably the alkali hydroxide or alkali carbonate which is added to the cooled dispersion of coagulated blood is sodium hydroxide or sodium carbonate. Most desirably, an alkali silicate is used, and preferably sodium silicate. After the sodium silicate has been added, it is desirable to add an extender which may be wheat flour, and then reduce the pH of the alkaline adhesive mixture to below about 9.0 by incorporating in the mixture a pH regulating material which may be a low alkaline material, such as a low alkaline thermosetting resin, an acid, or an acid salt, or a combination of any of said materials. Suitable examples of thermosetting resins are urea-aldehyde, as exemplified by urea-formaldehyde, malamine-aldehyde resin, as exemplified by melamine-formaldehyde resin, and monohydric phenol-aldehyde resin, exemplified by phenol-formaldehyde resins.

The following is a specific example illustrating the present invention:

*Example 1*

240 parts of soluble dried blood were mixed with 300 grams of water having a temperature of 77° F. This mixture was agitated for a period of 5 minutes in order to form a thoroughly homogeneous solution which was free of lumps. Then 520 grams of water having a temperature of 212° F. was added to coagulate the blood component of the aqueous solution of soluble dried blood. While the water was being added, the mixture was agitated to maintain the coagulated blood particles in finely divided condition and dispersed throughout the aqueous medium. Thereafter, the aqueous dispersion of coagulated blood particles, that is, the aqueous dispersion having the blood coagulum present, was cooled to a temperature below about 120° F. by mixing therewith 510 parts of water having a temperature of approximately 60° F. The aqueous dispersion of the coagulated blood was cooled so that when an alkaline material is subsequently added, the blood particles will not be converted into a gel of such a character that the properties of the final glue are deleteriously affected. 8 grams of pine oil functioning as an anti-foaming agent was added, and then there was introduced or incorporated into the resulting aqueous blood dispersion containing the coagulated blood particles, 40 parts of N-grade sodium silicate. During the time that the sodium silicate was being incorporated in the aqueous dispersion of the coagulated blood particles, the mixture was agitated to maintain the blood coagulum in a finely divided and homogeneous state and dispersed throughout the aqueous medium, whereby the action of the sodium silicate on the individual particles of the blood coagulum was facilitated. The sodium silicate acted to swell the particles of blood and thereby increase the viscosity of the final glue. The amount of sodium silicate added was sufficient to produce a pH of about 9.2. The resulting mass was then agitated for a period of about 2 minutes and then 400 parts of wheat flour was added, the latter functioning as an extender. The mass was then agitated for about 5 minutes to effect a uniform mixture, and then 250 grams of a thermosetting melamine-formaldehyde resin in the form of a powder was added. In general any of the prior art thermosetting melamine-aldehyde resins may be used including the prior art thermosetting melamine-formaldehyde resins. Particularly satisfactory results are obtained when the melamine-formaldehyde resin has a molar ratio of 1 mol of melamine to 1 to 3 mols of formaldehyde. However, the present invention is not limited to the use of a melamine-formaldehyde resin having the ratio set forth.

After the melamine resin is added, the mixture was agitated for a period of 5 minutes and then 520 grams of water was added. The pH of the mixture was 8.5 and the MacMichael viscosity thereof using a 26 MacMichael wire was 30. When the melamine-formaldehyde resin is added to the mixture, there is a decrease in the pH of the glue. When a latent catalyst is used, it is noted that the adhesive composition or glue is characterized by a drop in pH if the glue stands in the storage pot or when the glue is applied to veneers, the latter being heated in a hot press. This decrease in pH also functions to effect a complete and rapid cure of the resin constituent present in the glue when the glue is used in the production of plywood and particularly for plywood having a thin hardwood veneer, said plywood being adapted to be used in the manufacture of furniture. The decrease in pH also results in an increase in water resistance of the resulting plywood panel at the glue line.

It is desired to point out that the amount of melamine-aldehyde resin and more particularly melamine-formaldehyde resin which is added to the glue, should be sufficient to lower the pH of the glue, which had a pH above 9 before the addition of the melamine-formaldehyde resin, to a pH below 9. In the particular example set forth, the pH was lowered to 8.5. However, an additional amount of resin and/or a portion of acid or an acid salt could have been used and the pH could have been lowered to 8 or 8.3, or even below neutrality, that is, below 7. In general, the final pH of the glue of the present invention may vary from about 3 to about 9 or slightly below 9, the preferred pH range being between 4 and 8.5. While the thermosetting resin may be incorporated in the glue to accomplish this purpose, the pH of the glue may be reduced to below about 9 by incorporating in the glue an acidic material as, for example, an acid or an acid salt. Lowering of the pH of the final glue below about 9 can be accomplished also by adding to the glue only a low alkaline thermosetting resin of the character herein referred to. Further, the pH of the glue may be lowered below about 9 by adding a thermosetting resin which has an alkaline reaction in aqueous solution in combination with an auxiliary pH regulating materal as, for example, any of the acids or acid salts commonly used for this purpose. For example, there may be incorporated in the glue a phenol-formaldehyde resin which does not function to decrease the pH of the adhesive composition or glue to below about 9. When such a resin is incorporated into glue, at the end of the formulation of the glue a suitable acid or acid salt may be added to reduce the pH of the glue to below about 9.

The pH of the glue may also be reduced below about 9 by adding thereto a thermosetting resin which is admixed with a latent catalyst.

It is desired to point out that in the production of plywood employing a glue which contains a highly colored adhesive component, such as blood and/or thermosetting resins, it is particularly desirable to reduce the pH. This is a very serious problem in the production of hardwood veneers suitable for the production of furniture due to the thinness of the veneers and to the fact that slight wood faults may be present in the veneer. There is an infinite number of fine pores in the veneer through which the colored adhesive materials can bleed to the outer surface. This problem of bleed-through has been solved by the employment of a glue which has low flow and low penetration properties.

The lowering of the pH of the glue of the present invention avoids staining of the thin hardwood veneers. Further, the lowering of the pH utilizing a melamine resin as, for example, melamine-formaldehyde, or a urea-aldehyde resin as, for example, urea-formaldehyde, functions to produce a complete and rapid cure of the resin component or constituent.

Further, the reduction of the pH in the final glue functions to reduce the solubility of the blood in the adhesive composition or glue and promotes the low flow and low penetration properties of the glue. The use of a catalyst in admixture with a urea aldehyde or melamine aldehyde resin is particularly desirable because these catalysts assist in the further polymerization and cure of the resin after it has been applied to the wood plies. For this purpose, it is desirable to use the ammonium salts, and particularly ammonium chloride.

*Example II*

240 parts of a composition in powder form containing a predominant amount of soluble dried blood, which was prepared as herein set forth, namely, by drying fresh blood without coagulating it, were mixed with 300 grams of water having a temperature of 77° F. More specifically, the soluble blood powder composition contained 91% of soluble whole dried blood; 6.2% of urea crystals; 0.90% of ammonium chloride; 0.45% of sodium metabisulphite; 0.45% talc, and 1.00% pine oil. The resulting aqueous mixture was agitated for a period of 5 minutes in order to form a thoroughly homogeneous solution which was free of lumps. Since in accordance with the present example the above prepared aqueous blood base later has a urea-formaldehyde resin incorporated therein, it is desirable in the specific form of the invention represented by Example II to include the urea crystals which function to react with any free formaldehyde, ammonium chloride functioning as a catalyst for the urea-formaldehyde resin and talc as a carrier for said ammonium chloride catalyst. The talc also functions as the carrier for the sodium metabisulphite. Since the glue of the present example contains an extender, such as wheat flour, it is preferable to have present a material preventing excessive thixotropy and the sodium metabisulphite functions in this capacity. The pine oil, of course, functions as an anti-dusting agent and to prevent foaming.

After the soluble blood composition of the character above set forth was mixed with water and thoroughly agitated, 520 grams of water having a temperature of 212° F. were added to coagulate the blood component of the aqueous solution of the soluble blood. While the water was being added, the mixture was agitated to maintain the coagulated blood particles in finely divided condition and dispersed throughout the aqueous medium. Thereafter, the aqueous dispersion of the coagulated blood particles, that is, the aqueous dispersion having a blood component present, was cooled to a temperature below about 120° F. by mixing therewith 510 parts of water having a temperature of approximately 60° F. Since pine oil which functions as an anti-foaming agent was present in the powdered blood composition, usually it is not necessary at this point to add any further amount of anti-foaming agent. However, an additional amount can be added if it is necessary. There was then introduced or incorporated in the resulting aqueous blood dispersion containing the coagulated blood particles 40 parts of N-grade sodium silicate. During the time that the sodium silicate was being incorporated in the aqueous dispersion of the coagulated blood particles, the mixture was agitated to maintain the blood coagulum in a finely divided and homogeneous state and dispersed throughout the aqueous medium, whereby the action of the sodium silicate on the individual particles of the blood coagulum was facilitated. The sodium silicate acts to swell the particles of the blood and thereby increase the viscosity of the final glue.

The amount of sodium silicate added is sufficient to produce a pH of about 9.3.

The resulting mass was then agitated for a period of about 2 minutes, and then 400 parts of wheat flour added, the latter functioning as an extender. To the resulting mass there was added 250 grams of cold water having a temperature of approximately 60° F. and 250 grams of a urea formaldehyde resin having a 50% concentration of resin solids. The resulting mass was then agitated for a period of 5 minutes to effect a uniform mixture. The catalyst for effecting further polymerization and/or cure of the urea formaldehyde condensation product which was added to the blood base prepared as set forth, was already present in the blood base and need not again be added at this point in the preparation of the glue.

The urea formaldehyde condensation product which is the resin component used in this example, was prepared by reacting 2.4 mols of 37% formaldehyde with 1 mol of urea at a pH of 9 to 9.2. The mixture was heated and the temperature was raised during a period of 30 minutes to 155° F. Thereafter, the batch was acidified to a pH between 4.1 and 4.5 and the reaction was continued until the condensed mass had a suitable viscosity of FG to G at 25° C. on the Gardner-Holdt scale, this viscosity being obtained at a temperature of about 200° F., heat having been continuously supplied to the reacting mixture. The pH was adjusted upwardly to between the limits of about 9 and 9.2 through the addition of a 50% solution of sodium hydroxide. Dehydration of the mixture was continued at a temperature above 185° F. Thereafter, a second addition of urea was made in an amount sufficient to reduce the molar ratio to 1.58 mols of formaldehyde for each mol of urea, and the mixture was then cooled slowly to 90° F. over a period of 1½ to 2 hours. The pH of the resulting mixture was checked and adjusted when necessary to between 7.2 and 7.5 by the addition of a sufficient amount of 50% sodium hydroxide solution. The temperature of the mixture was thereafter dropped to room or storage temperature. The resulting resin has a fairly short storage life, namely, six months.

While urea formaldehyde resin prepared as above gives particularly satisfactory results, any of the prior art urea formaldehyde resins may be used in carrying out the present invention.

The glue produced in accordance with Example II had a MacMichael viscosity of 48 using a 26 MacMichael wire. The pH of the final glue was 8.3. It is, of course, obvious that any inert carrier may be used for the urea-formaldehyde catalyst. While the urea crystals have been added in with the blood powder composition, the urea crystals may be omitted from the blood powder composition and added at a later stage in the process, the function of the urea crystals being to combine with any free formaldehyde to prevent controlled gelation. The amount of urea crystals may be varied considerably as, for example, from 6.2% to as much as 13% based on 100 pounds of soluble dried blood prepared by drying fresh blood without coagulating it as previously pointed out.

*Example III*

240 parts of soluble dried blood prepared by drying fresh blood without coagulating it by the method herein described, were mixed with 300 grams of water having a temperature of 77° F. The mixture was agitated for a period of 5 minutes to form a homogeneous solution free of lumps. Then 520 grams of water having a temperature of 212° F. were added to coagulate the blood component of the aqueous solution of soluble dried blood. While the water was being added, the mixture was agitated to maintain the coagulated blood particles in a finely divided condition and dispersed throughout the aqueous medium.

Thereafter, the aqueous dispersion of coagulated blood particles was cooled to a temperature below 120° F. by mixing therewith 510 parts of water having a temperature of approximately 60° F. Then 8 grams of pine oil, 40 grams of N-grade sodium silicate, and 400 grams of a thermosetting phenol-formaldehyde resin were added. This resin was produced in accordance with the method set forth in Booty Patent No. 2,462,253, granted February 22, 1949. This resin is prepared by condensing 1 mol of phenol and about 1.87 mols of formaldehyde in water in the presence of an alkali metal hydroxide catalyst. This particular thermosetting phenol-formaldehyde resin has an alkalinity equivalent to 2.15% of caustic. It is what is known as a low caustic phenol-formaldehyde resin. The resulting mixture containing the phenol-formaldehyde resin was then agitated for a period of 2 minutes and then 400 grams of wheat flour added, and the mixture was again agitated for a period of 5 minutes. The glue had a pH of 9.1.

Since the phenol-formaldehyde resin does not function to decrease the pH of the glue, the pH of the glue was decreased by the addition of 11 ml. of 6 normal hydrochloric acid. The resulting glue had a MacMichael viscosity of 20 and a pH of 8.5.

The phenol-formaldehyde resin and the acid component may be considered a thermosetting resin composition which functions to reduce the pH of the aqueous dispersion of the glue containing the coagulated blood particles and simultaneously to increase the water resistance of the glue. The resin and the acid component are the essential constituents of the resin composition. However, the acid can be added independently after the phenol-formaldehyde thermosetting resin has been incorporated into the glue to thereby reduce the pH of the glue below about 9.

The glue produced by Examples I, II and III were used in the production of three-ply 7/16 inch fir panels, said panels being pressed at 270° F. and at a pressure of 200 pounds per square inch, the assembly times being 10 minutes and the glue spread being 72 pounds per 1,000 square feet of double glue line. The plywood panels utilizing glues produced by Examples I and II were pressed 6 minutes, while the plywood panels utilizing glue produced in accordance with Example III were pressed 6½ minutes. The plywood panel produced using the glue of Example I, said glue including a dispersion of coagulated blood particles in admixture with a melamine-formaldehyde resin, had a dry shear in pounds per square inch of 184 pounds and a percent wood failure of 90.

When subjected to a wet shear test by the standard method used in the industry, the panel failed at 144 pounds per square inch and the percentage of wood failure was 92. Another panel formulated and tested under substantially identical conditions had a dry shear of 188 pounds per square inch, a percent wood failure of 84; a wet shear of 168 pounds per square inch and percent of wet shear wood failure of 97%.

Panels assembled as above set forth with the glue produced in accordance with Example II had a dry shear test of 150 pounds per square inch and percentage wood failure of 96. The wet shear test of the panel utilizing glue produced in accordance with Example II was 106 pounds per square inch and the percentage of wood failure was 49%.

The panel assembled as set forth with glue produced in accordance with Example III and subjected to the usual dry shear test failed at 144 pounds per square inch. The percentage of wood failure was 12%. When the panel was subjected to the wet shear test, it failed at 46 pounds per square inch, and the percentage of wood failure was 3.

It is desirable in one form of the invention to incorporate in the alkaline glue a thermosetting resin which may function to reduce the pH of the glue so that when the glue is applied to relatively thin veneers as, for example, light colored hardwood veneers, the glue will not migrate or bleed through the many pores of the veneer and color the veneer. Further, the resin ingredient functions to increase the water resistance of the glue. These thermosetting resin materials, as set forth, include the melamine-aldehyde, the urea-aldehyde, and the monohydric phenol-aldehyde resins. The latter resin may take the form of a thermosetting monohydric phenol-formaldehyde resin which has such a low alkalinity that the pH of the final glue is reduced to below about 9. When the phenol-aldehyde resin or any of the other resins do not function as a pH regulating material to lower the pH of the glue sufficiently and reduce it below about 9, the glue may have incorporated therein an auxiliary pH regulating agent which may be an acid, either organic or inorganic, or an acid salt. The auxiliary pH regulating agent may be compounded, if desired, with the thermosetting resin. For example, the monohydric phenol-aldehyde resin may have a small amount of an acid-generating component mixed therewith, said mixture or composition functioning to reduce the pH of the glue to below about 9. The amount of thermosetting resin incorporated in the glue of the present invention may vary, for example, from about 10 parts to about 250 parts by weight (solids basis) of thermosetting resin or resin composition per 100 parts of blood expressed as soluble dried blood. The urea-aldehyde resin may be added in liquid form or may be added in the form of a powder. When added in liquid form, it usually contains between 50 and 70% concentration of resin solids. The melamine aldehyde resins may also be incorporated in the glue in liquid form or in powder form and these resins have the usual commercial solids content which may vary from about 40% to 70%. The monohydric phenol aldehyde resins may have a solids content running between 25% and 55%, although in some cases the resin solids content may be low, as for example, 20%. The solids content of the various resins is set forth by way of illustration and not by way of limitation.

It is desired to point out that the aldehydes with which the urea, melamine or the phenol may be reacted may comprise formaldehyde or materials generating formaldehyde, acetaldehyde, benzaldehyde, propiolaldehyde, butylaldehyde, furfural aldehyde, and the like.

While the extender present preferably is wheat flour, a nut shell flour may be substituted therefor, including walnut shell flour and cashew nut shell flour. For the wheat flour, any other cereal flour may be used, including those produced from rye, barley, oats, rice, and the like. Instead of using a cereal flour, a vegetable material may be used, and this vegetable material may be a lignocellulose material, and especially a lignocellulose material selected from the group of lignocellulose materials consisting of tree bark, nut shells, and the endocarps of drupes. There may be substituted for the wheat flour Furafil, which is a residue from the production of furfural from corn cobs. The corn cobs are ground and heated under pressure with an acid which hydrolyzes the pentosan to furfural. The lignocellulose residue is dried and further ground. This is the product which is marketed under the trademark Furafil by the Quaker Oats Company.

In general, it may be stated that while the bark of a number of trees may be used as a filler or extender, the bark of certain of the coniferous trees give especially good results. These trees include the firs, exemplified by the Douglas fir, the pines, the cedars and the hemlocks. In general, the barks of trees comprise cork, phelloderm, and the parenchyma tissue and sclerenchyma tissue of the bark phloem. Pieces of bark taken from different trees show a wide variation in relative amounts of cork and phloem, grading from pieces consisting almost entirely of phloem and having but thin lunes of cork to those consisting of large masses of cork with small islands of phloem existing in the cork.

The barks of trees may be comminuted and differentially separated by appropriate treatment into certain fractions, as set forth in Anway Patents No. 2,437,672 and No. 2,446,551, and Grondal et al. Patent No. 2,627,375. Silvacon 472 defines a tree bark composition which comprises lignified fibers, parenchyma tissue, and some cork, it being preferred that the cork be not greater than 20%. In carrying out the examples, the Silvacon 472 may comprise about 40% lignified fiber, 40% parenchyma tissue powder, and 20% cork, although there may be obviously substituted therefor other tree bark fractions or compositions, natural or produced by concentration processes, as hereinafter pointed out. The lignified fibers and the parenchyma tissue powder represent the phloem constituents and the cork represents a non-phloem constitutent. Instead of using Silvacon 472, there may be substituted therefor an amorphous parenchyma tissue powder. Another bark tree fraction which may be used in carrying out the invention is one comprising about 70% to 75% lignified fibers and 20% to 25% cork. It is not desired to be limited to any particular tree bark fraction. The comminuted tree bark contains lignin in a major proportion and any fraction of the comminuted tree bark, natural or produced by a process of concentration, which comprises lignin in a substantial proportion, or any mixture of the lignin components of the tree bark may be used in carrying out the invention, it being preferred, however, that the cork be present in an amount less than 20%. In carrying out the present invention, good results are obtained when the vegetable material comprises chiefly the non-fibrous component of bark phloem.

Representative endocarps or stones of drupes which may be used are apricot, peach, and prune stones.

The monohydric phenol which is reacted with any of the aldehydes herein set forth may be selected from the group consisting of phenol per se $C_6H_5OH$, xylenol, and cresol.

It is desired to point out that it is characteristic of the glues of the present invention that they contain relatively large proportions of extender. As shown in Example I, there are 400 parts of wheat flour and 200 parts of soluble dried blood. This is a ratio of almost 2 parts of wheat flour per part of soluble dried blood. In Example I, 490 parts of melamine resin powder and soluble dried blood in powder form are present for 400 parts of wheat flour. Based on the combined soluble blood and melamine resin powder, there is little less than 1 part of wheat flour for each part of the combined resin powder and soluble dried blood powder. In general, the proportion of extender may be as little as ½ part of dry extender to 1 part of soluble dried blood or as much as 2 or 2½ parts of extender per part of soluble dried blood powder, depending on the intended use of the adhesive composition. The proportion of extender flour based on the amount of soluble dried blood used or based on the amount of resin used or based on the combined amount of soluble dried blood and resin powder may vary considerably.

In general, it may be stated that the use of extenders serves to take up, in part, the water used in the formulation of the adhesive to give it appropriate body, as well as to extend the more expensive adhesive ingredients of the mix. Appropriate use of extenders as to amount as well as to type permits the glue maker to control viscosity, spreading characteristics, the nature of the spread glue, film, and the cost of the adhesive. The degree of flow and degree of penetration of the adhesive on the veneer when plywood is being pressed are also affected by the various extenders. Control in these respects is thus obtained by the choice of type and amount of extender used.

Instead of reducing the pH of the alkaline glue to below 9 by incorporating therein a thermosetting resin, the pH of the glue may be reduced by incorporating therein an acid or acid salt. Examples of suitable acids are hydrochloric acid, sulfuric acid, acetic acid, propionic acid, and the like. The acid salts are exemplified by ammonium chloride, ammonium sulfate, and ammonium acetate. The strong mineral acids or an acid salt of the strong mineral acids give particularly satisfactory results. The above acids and acid salts are illustrative of acidic materials that may be combined with the herein set forth thermosetting resins or which may be used independently thereof. The low alkaline thermosetting resins function to reduce the pH of the alkaline glue to below about 9 and to simultaneously increase the water resistance of the glue. The acidic materials when used independently of the thermosetting resin or in combination therewith function to reduce or to assist in reducing the pH of the alkaline glue to below about 9.

The MacMichael viscosity, herein abbreviated as MM, may be defined as follows: the viscosity reading in degrees which a sample produces when tested with a No. 26 wire spindle in a MacMichael rotating viscometer which turns at 20 R. P. M. The spindle used in carrying out the different viscosity tests is the standard MacMichael spindle, 9.4 mm. in diameter and immersed 4.8 centimeters in the material being tested. In the examples herein set forth, the MM viscosity is the initial viscosity. Tests of the adhesives produced in accordance with the processes of this invention or the products herein have disclosed that initial MM viscosities in the range of from 15 to 20 on the low end have varied to as high as 150 MM degrees on the upper end of the viscosity range. In general, an effective range is preferably 20 to 70 MM degrees. As the adhesives age after compounding, the viscosity tends to increase slowly, but it has been observed that this glue has thixotropic characteristics which, despite increasing MM viscosities, is nevertheless spreadable on standard glue spreading apparatus under conditions wherein high shear is present. Viscosity in this adhesive is the resultant of many variables including variations in the processing of the materials and variation in the proportions of the ingredients used.

We claim:

1. The process of producing a glue which although containing a blood adhesive constituent minimizes staining of a light colored thin veneer when the glue is applied thereto, comprising providing an aqueous solution of soluble dried blood, heat coagulating the blood in said solution by increasing its temperature to above 120° F. by the addition of hot water at about the boiling point thereof while agitating the solution for maintaining the coagulated blood particles in finely divided condition and dispersed throughout the aqueous medium, cooling the resulting aqueous dispersion of coagulated blood to a temperature of below 120° F., introducing into the resulting blood dispersion sodium silicate to raise the pH of the dispersion to between the limits of 9 and 9.7 and simultaneously swell the blood particles and increase the adhesive properties of the blood dispersion and its viscosity, said blood dispersion during the introduction of the sodium silicate being agitated to maintain the blood coagulum in a finely divided and homogeneous state dispersed throughout the aqueous medium to thereby facilitate the action of the sodium silicate on the individual particles of the blood coagulum and then reducing the penetration properties of the resulting glue and substantially inhibiting staining of a thin veneer when the glue is applied thereto by reducing the pH of the glue below 9.

2. The process defined in claim 1 in which reduction of the penetration properties of the resulting glue and substantial inhibition of staining of a thin veneer when the glue is applied thereto is obtained by incorporating in the glue a urea-formaldehyde resin and reducing the pH of the glue to below about 9.

3. The process of producing a glue which although containing a blood adhesive constituent minimizes staining of a light-colored thin veneer when the glue is applied thereto, comprising providing an aqueous blood material selected from the group consisting of fresh blood, an aqueous solution of soluble dried blood, and mixtures thereof, converting said aqueous blood material into an aqueous dispersion of coagulated blood particles selected from the group consisting of blood particles heat-coagulated at a temperature between 120° F. and the boiling point of the aqueous blood material, and acid-coagulated blood particles, by coagulating the blood in said initially provided aqueous blood material while agitating it for maintaining the coagulated blood particles in finely divided condition and dispersed throughout the aqueous medium, introducing an alkaline material into the resulting blood dispersion while maintaining the latter in aqueous form at a temperature below 120° F., said alkaline material raising the pH of the dispersion above 9 while simultaneously swelling the blood particles and increasing the viscosity and adhesive properties of the blood dispersion, said pH being raised by providing in said dispersion an alkali metal hydroxide, and then reducing the penetration properties of the resulting glue and substantially inhibiting staining of a thin veneer when the glue is applied thereto by reducing the pH of the glue to below 9.

4. The product of the process defined in claim 3.

5. The process of producing a glue which although containing a blood adhesive constituent minimizes staining of a light-colored thin veneer when the glue is applied thereto, comprising providing an aqueous blood material selected from the group consisting of fresh blood, an aqueous solution of soluble dried blood, and mixtures thereof, converting said aqueous blood material into an aqueous dispersion of coagulated blood particles selected from the group consisting of blood particles heat-coagulated at a temperature between 120° F. and the boiling point of the aqueous blood material, and acid-coagulated blood particles, by coagulating the blood in said initially provided aqueous blood material while agitating it for maintaining the coagulated blood particles in finely divided condition and dispersed throughout the aqueous medium, introducing an alkaline material into the resulting blood dispersion while maintaining the latter in aqueous form at a temperature below 120° F., said alkaline material raising the pH of the dispersion to between the limits of 9 and 9.7 while simultaneously swelling the blood particles and increasing the viscosity and adhesive properties of the blood dispersion, said pH being raised by providing in said dispersion an alkali metal hydroxide, and then reducing the pentration properties of the resulting glue and substantially inhibiting staining of a thin veneer when the glue is applied thereto by reducing the pH of the glue to below 9.

6. The process of producing a glue which although containing a blood adhesive constituent minimizes staining of a light-colored thin veneer when the glue is applied thereto, comprising providing an aqueous blood material selected from the group consisting of fresh blood, an aqueous solution of soluble dried blood, and mixtures thereof, converting said aqueous blood material into an aqueous dispersion of coagulated blood particles selected from the group consisting of blood particles heat-coagulated at a temperature between 120° F. and the boiling point of the aqueous blood material, and acid-coagulated blood particles, by coagulating the blood in said initially provided aqueous blood material while agitating it for maintaining the coagulated blood particles in finely divided condition and dispersed throughout the aqueous medium, introducing an alkaline material into the resulting blood dispersion while maintaining the latter in aqueous form at a temperature below 120° F., said alkaline material raising the pH of the dispersion to between the limits of 9 and 9.7 while simultaneously swelling the blood particles and increasing the viscosity and adhesive properties of the blood dispersion, said pH being raised by providing in said dispersion an alkali metal hydroxide, and then reducing the pH of the glue to below 9 while maintaining the MM viscosity of the glue between 15 and 150, said reduction in pH assisting in reducing the penetration properties of the resulting glue and substantially inhibiting staining of a thin veneer when the glue is applied thereto.

7. The process of producing a glue which although containing a blood adhesive constituent minimizes staining of a light-colored thin veneer when the glue is applied thereto, comprising providing an aqueous blood material selected from the group consisting of fresh blood, an aqueous solution of soluble dried blood, and mixtures thereof, converting said aqueous blood material into an aqueous dispersion of coagulated blood particles selected from the group consisting of blood particles heat-coagulated at a temperature between 120° F. and the boiling point of the aqueous blood material, and acid-coagulated blood particles, by coagulating the blood in said initially provided aqueous blood material while agitating it for maintaining the coagulated blood particles in finely divided condition and dispersed throughout the aqueous medium, introducing an alkaline material into the resulting blood dispersion while maintaining the latter in aqueous form at a temperature below 120° F., said alkaline material raising the pH of the dispersion to between the limits of 9 and 9.7 while simultaneously swelling the blood particles and increasing the viscosity and adhesive properties of the blood dispersion, said pH being raised by providing in said dispersion an alkali metal hydroxide, and incorporating in the glue a thermosetting resin and reducing the pH of the glue to below 9, the MM viscosity of the glue being simultaneously maintained between 15 and 150, said reduction in pH assisting in reducing the penetration properties of the resulting glue and substantially inhibiting staining of a thin veneer when the glue is applied thereto.

8. The process of producing a glue which although containing a blood adhesive constituent minimizes staining of a light-colored thin veneer when the glue is applied thereto, comprising providing an aqueous blood material selected from the group consisting of fresh blood, an aqueous solution of soluble dried blood, and mixtures thereof, heat-coagulating blood in said solution while increasing its temperature to between 120° F. and the boiling point of the aqueous blood solution while agitating it for maintaining the coagulated blood particles in finely divided condition and dispersed throughout the aqueous medium, cooling the resulting aqueous dispersion of coagulated blood to a temperature of below 120° F. while maintaining the dispersion in aqueous form, introducing an alkaline material into the resulting cooled blood dispersion, said alkaline material raising the pH of the dispersion above 9 while simultaneously swelling the blood particles and increasing the viscosity and adhesive properties of the blood dispersion, said pH being raised by providing in said dispersion an alkali metal hydroxide, and then reducing the penetration properties of the resulting glue and substantially inhibiting staining of a thin veneer when the glue is applied thereto by reducing the pH of the glue to below 9.

9. The process defined in claim 8 in which the alkaline material introduced into the cooled blood dispersion is an alkali metal silicate.

10. The process of producing a glue which although containing a blood adhesive constituent minimizes staining of a light-colored thin veneer when the glue is applied thereto, comprising providing an aqueous blood material selected from the group consisting of fresh blood, an aqueous solution of soluble dried blood, and mixtures thereof, heat-coagulating blood in said solution while increasing its temperature to between 120° F. and the boiling point of the aqueous blood solution while agitating it for maintaining the coagulated blood particles in finely divided condition and dispersed throughout the aqueous medium, cooling the resulting aqueous dispersion of coagulated blood to a temperature of below 120° F. while maintaining the dispersion in aqueous form, introducing an alkaline material into the resulting cooled blood dispersion, said alkaline material raising the pH of the dispersion to between the limits of 9 and 9.7 while simultaneously swelling the blood particles and increasing the viscosity and adhesive properties of the blood dispersion, said pH being raised by providing in said dispersion an alkali metal hydroxide, and then reducing the penetration properties of the resulting glue and substantially inhibiting staining of a thin veneer when the glue is applied thereto by reducing the pH of the glue to below 9.

11. The process defined in claim 10 in which the alkaline material introduced into the cooled blood dispersion is an alkali metal silicate.

12. The process of producing a glue which although containing a blood adhesive constituent minimizes staining of a light-colored thin veneer when a glue is applied thereto, comprising providing an aqueous solution of soluble dried blood, heat-coagulating the blood in said solution and increasing its temperature to above 120° F. by the addition to said solution of hot water at approximately the boiling point while agitating the solution for maintaining the coagulated blood particles in finely divided condition and dispersed throughout the aqueous medium, introducing an alkali metal silicate into the resulting blood dispersion while maintaining the latter in aqueous form at a temperature below 120° F., said alkali metal silicate raising the pH of the dispersion medium above 9 while simultaneously swelling the blood particles and increasing the viscosity and adhesive properties of the blood dispersion, and then reducing the penetration properties of the resulting glue and substantially inhibiting staining of a thin veneer when the glue is applied thereto by reducing the pH of the glue to below 9.

13. The process defined in claim 12 in which the reduction of the pH of the glue to below 9 is effected by incorporating in the glue a urea-aldehyde resin.

14. The process of producing a glue which although containing a blood adhesive constituent minimizes staining of a light colored thin veneer when the glue is applied thereto, comprising providing an aqueous solution of soluble dried blood, heat coagulating the blood in said solution by increasing its temperature to between 120° F. and the boiling point of the aqueous blood material while agitating it for maintaining the coagulated blood particles in finely divided condition and dispersed throughout the aqueous medium, introducing an alkaline material into the resulting blood dispersion while maintaining the latter in aqueous form at a temperature below 120° F., said alkaline material raising the pH of the dispersion above 9 while simultaneously swelling the blood particles and increasing the viscosity and adhesive properties of the blood dispersion, said pH being raised by providing in said dispersion an alkali metal hydroxide, and then reducing the penetration properties of the resulting glue and substantially inhibiting the staining of a thin veneer when the glue is applied thereto by reducing the pH of the glue to below 9.

15. The process of producing a glue which although containing a blood adhesive constituent minimizes staining of a light colored thin veneer when the glue is applied thereto, comprising providing an aqueous solution of soluble dried blood, heat coagulating the blood in said solution by increasing its temperature to between 120° F. and the boiling point of the aqueous blood material while agitating it for maintaining the coagulated blood particles in finely divided condition and dispersed throughout the aqueous medium, introducing an alkali metal silicate into the resulting blood dispersion while maintaining the latter in aqueous form at a temperature below 120° F., said alkali metal silicate raising the pH of the dispersion above 9 while simultaneously swelling the blood particles and increasing the viscosity and adhesive properties of the blood dispersion, and then reducing the penetration properties of the resulting glue and substantially inhibiting the staining of a thin veneer when the glue is applied thereto by reducing the pH of the glue to below 9.

16. The process of producing a glue which although containing a blood adhesive constituent minimizes staining of a light colored thin veneer when the glue is applied thereto, comprising providing an aqueous solution of soluble dried blood, heat coagulating the blood in said solution by increasing its temperature to between 120° F. and the boiling point of the aqueous blood material while agitating it for maintaining the coagulated blood particles in finely divided condition and dispersed throughout the aqueous medium, introducing an alkaline material into the resulting blood dispersion while maintaining the latter in aqueous form at a temperature below 120° F., said alkaline material raising the pH of the dispersion above 9 while simultaneously swelling the blood particles and increasing the viscosity and adhesive properties of the blood dispersion, said pH being raised by providing in said dispersion an alkali metal hydroxide, and then incorporating in the resulting glue a thermosetting resin and reducing the pH of the glue to below 9 to thereby reduce the penetration properties of the resulting glue.

17. The process of producing a glue which although containing a blood adhesive constituent minimizes staining of a light colored thin veneer when the glue is applied thereto, comprising providing an aqueous solution of fresh blood, heat coagulating the blood in said solution by increasing its temperature to between 120° F. and the boiling point of the aqueous blood material while agitating it for maintaining the coagulated blood particles in finely divided condition and dispersed throughout the aqueous medium, introducing an alkaline material into the resulting blood dispersion while maintaining the latter in aqueous form at a temperature below 120° F., said alkaline material raising the pH of the dispersion above 9 while simultaneously swelling the blood particles and increasing the viscosity and adhesive properties of the blood dispersion, said pH being raised by providing in said dispersion an alkali metal hydroxide, and then reducing the penetration properties of the resulting glue and substantially inhibiting the staining of a thin veneer when the glue is applied thereto by reducing the pH of the glue to below 9.

References Cited in the file of this patent

UNITED STATES PATENTS

| | | |
|---|---|---|
| 1,976,436 | Cone | Oct. 9, 1934 |
| 2,389,183 | Cone | Nov. 20, 1945 |
| 2,400,541 | Cone | May 21, 1946 |
| 2,466,710 | Keil et al. | Apr. 12, 1949 |